US010715336B2

(12) United States Patent
Wright et al.

(10) Patent No.: US 10,715,336 B2
(45) Date of Patent: Jul. 14, 2020

(54) PERSONAL DEVICE SECURITY USING ELLIPTIC CURVE CRYPTOGRAPHY FOR SECRET SHARING

(71) Applicant: nChain Holdings Limited, St. John's (AG)

(72) Inventors: Craig Steven Wright, London (GB); Stephane Savanah, London (GB)

(73) Assignee: nChain Holdings Limited, St. Johns (AG)

( * ) Notice: Subject to any disclaimer, the term of this patent is extended or adjusted under 35 U.S.C. 154(b) by 0 days.

(21) Appl. No.: 16/079,082

(22) PCT Filed: Feb. 14, 2017

(86) PCT No.: PCT/IB2017/050815
§ 371 (c)(1),
(2) Date: Aug. 22, 2018

(87) PCT Pub. No.: WO2017/145002
PCT Pub. Date: Aug. 31, 2017

(65) Prior Publication Data
US 2019/0058600 A1 Feb. 21, 2019

(30) Foreign Application Priority Data

Feb. 23, 2016 (GB) .................................. 1603117.1
Feb. 23, 2016 (GB) .................................. 1603122.1
Nov. 15, 2016 (GB) .................................. 1619301.3

(51) Int. Cl.
*H04L 9/32* (2006.01)
*H04W 12/02* (2009.01)
(Continued)

(52) U.S. Cl.
CPC ............ *H04L 9/3252* (2013.01); *H04L 9/085* (2013.01); *H04L 9/0825* (2013.01);
(Continued)

(58) Field of Classification Search
CPC ... H04L 9/3252; H04L 9/0825; H04L 9/0841; H04L 9/085; H04L 9/0891; H04L 9/3066;
(Continued)

(56) References Cited

U.S. PATENT DOCUMENTS 5,600,725 A 2/1997 Rueppel et al.
5,761,305 A 6/1998 Vanstone et al.
(Continued)

FOREIGN PATENT DOCUMENTS

AU 2016100059 A4 3/2016
CN 103440209 A 12/2013
(Continued)

OTHER PUBLICATIONS

Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.
(Continued)

*Primary Examiner* — Techane Gergiso
(74) *Attorney, Agent, or Firm* — Davis Wright Tremaine LLP (57) ABSTRACT

A method (400) of encrypting data at an electronic device (3) where the electronic device is associated with a key device (5). Each device is associated with an asymmetric cryptography pair, each pair including a first private key and a first public key. Respective second private and public keys may be determined based on the first private key, first public key and a deterministic key. A secret may be determined based on the second private and public keys. The data at the electronic device (3) may be encrypted using the determined secret or an encryption key that is based on the secret.

(Continued)

Information indicative of the deterministic key may be sent to the key device (5) where the information may be stored.

27 Claims, 6 Drawing Sheets

(51) Int. Cl.
| | | |
|---|---|---|
| H04L 9/08 | (2006.01) | |
| H04L 9/30 | (2006.01) | |
| H04W 84/18 | (2009.01) | |

(52) U.S. Cl.
CPC .......... *H04L 9/0841* (2013.01); *H04L 9/0891* (2013.01); *H04L 9/3066* (2013.01); *H04W 12/02* (2013.01); *H04L 2209/56* (2013.01); *H04W 84/18* (2013.01)

(58) Field of Classification Search
CPC .... H04L 2209/56; H04W 12/02; H04W 84/18
See application file for complete search history.

(56) References Cited

U.S. PATENT DOCUMENTS

| | | | |
|---|---|---|---|
| 5,889,865 | A | 3/1999 | Vanstone et al. |
| 5,896,455 | A | 4/1999 | Vanstone et al. |
| 5,933,504 | A | 8/1999 | Vanstone et al. |
| 6,061,449 | A | 5/2000 | Candelore et al. |
| 6,078,667 | A | 6/2000 | Johnson |
| 6,122,736 | A | 9/2000 | Vanstone et al. |
| 6,141,420 | A | 10/2000 | Vanstone et al. |
| 6,618,483 | B1 | 9/2003 | Vanstone et al. |
| 6,704,870 | B2 | 3/2004 | Vanstone et al. |
| 6,785,813 | B1 | 8/2004 | Vanstone et al. |
| 6,792,530 | B1 | 9/2004 | Qu et al. |
| 7,006,633 | B1 | 2/2006 | Reece |
| 7,095,851 | B1 | 8/2006 | Scheidt |
| 8,522,011 | B2 | 8/2013 | Spalka et al. |
| 9,209,980 | B2 | 12/2015 | Bowman et al. |
| 9,258,130 | B2 | 2/2016 | Hwang et al. |
| 10,050,779 | B2 | 8/2018 | Alness et al. |
| 10,068,228 | B1 | 9/2018 | Winklevoss et al. |
| 2001/0050990 | A1 | 12/2001 | Sudia |
| 2003/0046202 | A1 | 3/2003 | Knapp |
| 2004/0049687 | A1 | 3/2004 | Orsini et al. |
| 2004/0193890 | A1 | 9/2004 | Girault |
| 2006/0023887 | A1 | 2/2006 | Agrawal et al. |
| 2006/0153368 | A1* | 7/2006 | Beeson ................ H04L 9/3066 380/30 |
| 2006/0156013 | A1* | 7/2006 | Beeson ................ H04L 9/3066 713/180 |
| 2006/0179319 | A1 | 8/2006 | Krawczyk |
| 2007/0055880 | A1 | 3/2007 | Lauter et al. |
| 2007/0192842 | A1 | 8/2007 | Beaulieu et al. |
| 2008/0082817 | A1 | 4/2008 | Takahashi et al. |
| 2008/0144836 | A1 | 6/2008 | Sanders et al. |
| 2008/0288773 | A1 | 11/2008 | Nguyen et al. |
| 2009/0161876 | A1 | 6/2009 | Sherkin |
| 2010/0023771 | A1 | 1/2010 | Struik |
| 2010/0131755 | A1 | 5/2010 | Zhu et al. |
| 2010/0150341 | A1 | 6/2010 | Dodgson et al. |
| 2010/0172501 | A1 | 7/2010 | Tian et al. |
| 2010/0199095 | A1 | 8/2010 | Ho |
| 2010/0228973 | A1 | 9/2010 | Dancer et al. |
| 2011/0022854 | A1 | 1/2011 | Macchetti et al. |
| 2011/0202773 | A1 | 8/2011 | Ghouti et al. |
| 2011/0307698 | A1* | 12/2011 | Vanstone ............. H04L 9/0825 713/171 |
| 2011/0311051 | A1* | 12/2011 | Resch .................... H04L 63/06 380/270 |
| 2012/0011362 | A1 | 1/2012 | Lambert |
| 2012/0039474 | A1 | 2/2012 | Ho |
| 2012/0100833 | A1 | 4/2012 | Gao |
| 2012/0290830 | A1 | 11/2012 | Resch et al. |
| 2012/0331287 | A1 | 12/2012 | Bowman et al. |
| 2013/0051552 | A1* | 2/2013 | Handschuh .......... G06F 21/602 380/44 |
| 2013/0061049 | A1 | 3/2013 | Irvine |
| 2013/0177157 | A1 | 7/2013 | Li et al. |
| 2013/0191632 | A1 | 7/2013 | Spector et al. |
| 2014/0082358 | A1 | 3/2014 | Nakhjiri et al. |
| 2014/0129844 | A1 | 5/2014 | Johnson et al. |
| 2015/0066748 | A1 | 3/2015 | Winslow et al. |
| 2015/0086020 | A1 | 3/2015 | Harjula et al. |
| 2015/0188700 | A1 | 7/2015 | Ben Saied et al. |
| 2015/0205929 | A1 | 7/2015 | Brama |
| 2015/0206106 | A1 | 7/2015 | Yago |
| 2015/0213433 | A1 | 7/2015 | Khan |
| 2015/0302401 | A1 | 10/2015 | Metral |
| 2015/0304302 | A1 | 10/2015 | Zhang |
| 2015/0324764 | A1 | 11/2015 | Van Rooyen et al. |
| 2015/0332224 | A1 | 11/2015 | Melika et al. |
| 2015/0350171 | A1* | 12/2015 | Brumley ............... H04L 63/061 713/170 |
| 2015/0356523 | A1 | 12/2015 | Madden |
| 2015/0363770 | A1 | 12/2015 | Ronca et al. |
| 2016/0085955 | A1 | 3/2016 | Lerner |
| 2016/0086175 | A1 | 3/2016 | Finlow-Bates et al. |
| 2016/0092988 | A1 | 3/2016 | Letourneau |
| 2016/0140335 | A1 | 5/2016 | Proulx et al. |
| 2016/0149878 | A1 | 5/2016 | Pogorelik et al. |
| 2016/0234026 | A1 | 8/2016 | Wilkins et al. |
| 2016/0261408 | A1 | 9/2016 | Peddada et al. |
| 2016/0261565 | A1* | 9/2016 | Lorenz ................. H04L 63/045 |
| 2016/0269182 | A1* | 9/2016 | Sriram ................. H04L 9/3242 |
| 2016/0283941 | A1 | 9/2016 | Andrade |
| 2016/0335924 | A1 | 11/2016 | Ikarashi et al. |
| 2016/0352518 | A1* | 12/2016 | Ford .................... G06F 12/1408 |
| 2016/0379208 | A1 | 12/2016 | Deliwala et al. |
| 2017/0011394 | A1 | 1/2017 | Kumar et al. |
| 2017/0103385 | A1 | 4/2017 | Wilson, Jr. et al. |
| 2017/0132621 | A1 | 5/2017 | Miller et al. |
| 2017/0154331 | A1 | 6/2017 | Voorhees |
| 2017/0243193 | A1 | 8/2017 | Manian et al. |
| 2017/0250801 | A1 | 8/2017 | Chen |
| 2018/0109377 | A1 | 4/2018 | Fu |
| 2018/0341648 | A1 | 11/2018 | Kakavand et al. |
| 2018/0367298 | A1 | 12/2018 | Wright et al. |
| 2019/0149337 | A1 | 5/2019 | Savanah et al. |
| 2019/0158470 | A1 | 5/2019 | Wright et al. |
| 2019/0220859 | A1 | 7/2019 | Weight et al. |
| 2019/0229911 | A1 | 7/2019 | Allen |
| 2019/0238334 | A1 | 8/2019 | Nakamura |

FOREIGN PATENT DOCUMENTS

| | | |
|---|---|---|
| CN | 103927656 A | 7/2014 |
| DE | 102010002241 B4 | 3/2012 |
| EP | 1477882 A2 | 11/2004 |
| EP | 2538606 A1 | 12/2012 |
| EP | 2975570 A1 | 1/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11289324 A | 10/1999 |
| JP | 2000502553 A | 2/2000 |
| JP | 2007242221 A | 9/2007 |
| JP | 2009526411 A | 7/2009 |
| JP | 2011082662 A | 4/2011 |
| WO | 2005107141 A1 | 11/2005 |
| WO | 2013053058 A1 | 4/2013 |
| WO | 2015127789 A1 | 9/2015 |
| WO | 2015171580 A1 | 11/2015 |
| WO | 2015175854 A2 | 11/2015 |
| WO | 2016161073 A1 | 10/2016 |

OTHER PUBLICATIONS

Antonopoulos, "Mastering Bitcoin—Unlocking Digital Cryptocurrencies," O'Reilly Media, Inc., Dec. 20, 2014, 282 pages.

(56) References Cited

OTHER PUBLICATIONS bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.

Bitfury Group, "Smart Contracts on Bitcoin Blockchain," BitFury Group Limited, Aug. 13, 2015 (updated Sep. 4, 2015), http://biffury.com/content/5-white-papers-research/contracts-1.1.1.pdf, 20 pages.

Brown et al., "Standards for Efficient Cryptography 1: Elliptic Curve Cryptography Version 2.0," Certicom Research, May 21, 2009, 144 pages.

Brown et al., "Standards for Efficient Cryptography 2: Recommended Elliptic Curve Domain Parameters Version 2.0," Certicom Research, Jan. 27, 2010, 37 pages.

Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.

Coinprism, "80 bytes OP_RETURN explained," Coinprism Blog, http://blog.coinprism.com/2015/02/11/80-bytes-op-return/, Feb. 11, 2015 [retrieved Dec. 21, 2018], 8 pages.

Corallo, "[Bitcoin-development] Relative Checklocktimeverify (was CLTV proposal)," Linux Foundation, https://lists.linuxfoundation.org/pipermail/bitcoin-dev/2015-May/007858.html, May 4, 2015 [retrieved Dec. 12, 2018], 3 pages.

Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.

Drcode,"New Kid on the Blockchain," Hacker News, https://news.ycombinator.com/item?id=11372455, Mar. 28, 2016 [Dec. 12, 2018], 32 pages.

Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2I91/time_to_lobby_bitcoins_core_devs_sf_bitcoin_devs/, Mar. 14, 2015 [Dec. 12, 2018], 21 pages.

Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.

Flood et al., "Contract as Automaton: The Computational Representation of Financial Agreements," Office of Financial Research Working Paper No. 15-04, Mar. 26, 2015, 25 pages.

Friedenbach et al., "Freimarkets: extending bitcoin protocol with user-specified bearer instruments, peer-to-peer axchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.

Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.

International Search Report and Written Opinion dated Apr. 26, 2017, International Patent Application No. PCT/IB2017/050865, filed Feb. 16, 2017, 9 pages.

International Search Report and Written Opinion dated May 29, 2017, International Patent Application No. PCT/IB2017/050815, filed Feb. 14, 2017, 10 pages.

Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.

Koblitz et al., "Cryptocash, Cryptocurrencies, and Cryptocontracts," Designs, Codes and Cryptography 78(1):87-102, publication available online Oct. 1, 2015, print publication Jan. 2016.

Krawczyk, "HMQV: A High-Performance Secure Diffie-Hellman Protocol," Annual International Cryptology Conference 2005, Aug. 14, 2005, first disclosed online Jul. 5, 2005, 66 pages.

Krellenstein, "The Counterparty Protocol," GitHub, https://github.com/jsimnz/Counterparty/blob/master/README.md, Jan. 8, 2014 [Dec. 12, 2018], 4 pages.

Maxwell et al., "Deterministic wallets," Bitcoin Forum, https://bitcointalk.org/index.php?topic=19137.0;all, Jun. 18, 2011 [retrieved Dec. 10, 2018], 104 pages.

OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.

OpenSSL Wiki, "EVP Key Agreement," OpenSSL, https://wiki.openssl.org/index.php/EVP_Key_Agreement, Apr. 28, 2017 [retrieved Dec. 10, 2018], 2 pages.

Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.

Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.

Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.

Tasca et al., "Digital Currencies: Principles, Trends, Opportunities, and Risks," ECUREX Research Working Paper, Sep. 7, 2015 (Oct. 2015 version), 110 pages.

Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.

UK Commercial Search Report dated Jun. 27, 2016, Patent Application No. GB1603123.9, filed Feb. 23, 2016, 11 pages.

UK Commercial Search Report dated Jun. 27, 2016, Patent Application No. GB1603125A, filed Feb. 23, 2016, 11 pages.

UK Commercial Search Report dated Jun. 28, 2016, Patent Application No. GB1603122.1, filed Feb. 23, 2016, 12 pages.

UK Commercial Search Report dated Jun. 9, 2016, Patent Application No. GB1603117.1, filed Feb. 23, 2016, 12 pages.

UK Commercial Search Report dated May 24, 2016, Patent Application No. GB16055711, filed Apr. 1, 2016, 3 pages.

UK Commercial Search Report dated May 9, 2016, Patent Application No. GB1603114.8, filed Feb. 23, 2016, 2 pages.

UK IPO Search Report dated Jul. 26, 2016, Patent Application No. GB1603114.8, filed Feb. 23, 2016, 5 pages.

UK IPO Search Report dated Jul. 4, 2016, Patent Application No. GB1603125.4, filed Feb. 23, 2016, 6 pages.

UK IPO Search Report dated Jul. 5, 2016, Patent Application No. GB1603123.9, filed Feb. 23, 2016, 5 pages.

UK IPO Search Report dated Oct. 17, 2016, Patent Application No. GB1603117.1, filed Feb. 23, 2016, 5 pages.

UK IPO Search Report dated Oct. 26, 2016, Patent Application No. GB1603122.1, filed Feb. 23, 2016, 4 pages.

UK IPO Search Report dated Sep. 9, 2016, Patent Application No. GB1605571.7, filed Apr. 1, 2016, 5 pages.

Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.

Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.

Wright, "Registry and Automated Management Method for Blockchain Enforced Smart Contracts," U.S. Appl. No. 15/138,717, filed Apr. 26, 2016.

"Bitcoin Developer Guide," Bitcoin Project, https://web.archive.org/web/20160515171209/https://bitcoin.org/en/developer-guide, May 15, 2016 [retrieved Mar. 13, 2019], 55 pages.

Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.

Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.

(56) References Cited

OTHER PUBLICATIONS

Counterparty, "Home Page," Counterparty, copyright 2018 [retrieved Jan. 13, 2020], counterparty.io, 3 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
European Communication pursuant to Article 94(3) EPC dated Jan. 2, 2020, Patent Application No. 18166910.2.-1218, filed Feb. 16, 2017, 4 pages.
European Communication pursuant to Article 94(3) EPC dated Jul. 1, 2019, Application No. 17707121.4-1218, filed Feb. 14, 2017, 6 pages.
Extended European Search Report dated Jul. 18, 2018, Patent Application No. 18166910.2-1218, filed Feb. 16, 2017, 8 pages.
Fimkrypto, "FIMK 0.6.4 Released," Github.com, Feb. 11, 2016 [retrieved Jan. 30, 2017], https://github.com/fimkrypto/fimk/releases, 17 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Gutoski et al., "Hierarchical deterministic Bitcoin wallets that tolerate key leakage (Short paper)," Financial cryptography and Data Security: 19th International Conference, FC 2015, Revised Selected Papers, Jan. 26, 2015, 9 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion dated Apr. 3, 2017, Patent Application No. PCT/IB2017/050824, filed Feburary 14, 2017, 13 pages.
International Search Report and Written Opinion dated May 31, 2017, Patent Application No. PCT/IB2017/050856, filed Feb. 16, 2017, 11 pages.
Japanese Office Action dated Jan. 22, 2019, Patent Application No. 2018-516682, filed Feb. 16, 2017, 14 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
McCorry et al., "Authenticated Key Exchange over Bitcoin," International Conference on Research in Security Standardisation 2015, Dec. 15, 2015, 18 pages.
Reiner et al., "Bitcoin Wallet Identity Verification Specification," diyhpluswiki, http://diyhpl.us/~bryan/papers2/bitcoin/armory-verisign-bitcoin-wallet-identityspecification.pdf, Feb. 27, 2015 (retrieved Jan. 27, 2016), 24 pages.
Ryepdx et al., "Answer to What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-plafforms/, 25 pages.
Third-Party Submission Under 37 CFR 1.290 dated Jun. 12, 2019, U.S. Appl. No. 16/078,605, filed Aug. 21, 2018, 31 pages.
Third-Party Submission Under 37 CFR 1.290 dated Jun. 12, 2019, U.S. Appl. No. 16/079,089, filed Aug. 22, 2018, 19 pages.
Tuesta et al., "Smart contracts: the ultimate automation of trust?," BBVA Research Financial Inclusion Unit, Oct. 2015, 5 pages.
UK Commercial Search Report dated Apr. 25, 2016, Patent Application No. 11603117.1, filed Feb. 23, 2016, 11 pages.
UK Commercial Search Report dated Sep. 30, 2016, Patent Application No. 1606630.0, filed Apr. 15, 2016, 7 pages.
UK IPO Search Report dated Dec. 12, 2016, Patent Application No. GB1606630.0, filed Apr. 15, 2016, 4 pages.
Vayngrib, "Future, operating business on chain," Github.com, May 4, 2015 [retrieved Jan. 30, 2017], https:/github.com/tradle/about/wiki/Future,-operating-business-on-chain, 9 pages.
Vietnamese Office Action dated Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Weller et al., "CounterpartyXCP/Documentation: Protocol Specification," Github.com, Jan. 25, 2015 (last edited Jun. 17, 2019) [retrieved Jan. 13, 2020], 10 pages.
Wikipedia, "Counterparty (platform)," last edited Dec. 6, 2019 [retrieved Jan. 13, 2020], 2 pages.
Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamirs_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php7title=Shamirs_Secret_Sharing&oldid=708636892, 6 pages.
Wuille, "Hierarchical Deterministic Wallets," Github, https://github.com/bitcoin/bips/blob/ab90b5289f0356282397fa968aa47d2238a7b380/bip-0032.mediawiki, Feb. 12, 2016 (retrieved Mar., 23, 2017), 3 pages.
Zhang et al., "AntShare Trading Platform," Github.com, Jun. 3, 2016 (last edited Aug. 21, 2016) [retrieved Jan. 30, 2017], https://github.com/AntShares/AntShares/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," arXiv preprint arXiv:1506, Jun. 10, 2015, 14 pages.

* cited by examiner

PERSONAL DEVICE SECURITY USING ELLIPTIC CURVE CRYPTOGRAPHY FOR SECRET SHARING

TECHNICAL FIELD

The present disclosure relates generally to the field of computer-related security and also encryption. More particularly, it provides a method, a system and a device for encrypting data stored on an electronic device. It is particularly suited for enhancing security on personal computing devices including, but not limited to, mobile phones, tablet devices or laptops. The present disclosure further relates to a method, a system and a device for decrypting the encrypted data.

BACKGROUND

Cryptography involves techniques for protecting data on a hard disk of an electronic device, for example in the event that the electronic device is lost or stolen. An electronic device may include a laptop computer, a desktop computer, a tablet computer, a mobile communication device and any other form of computing device. The electronic device may be associated with a natural person, a group of people such as employees of a company, a system such as a banking system, etc.

In some cases, the data on a hard disk of the electronic device may be protected by a password, passphrase or a PIN. However, short codes such as 4-8 character PINs can easily be determined by trailing different combinations of characters. Passwords and passphrases may be more secure than PINs. However, the level of security depends on the user memorising a lengthy set of code words or a sentence.

In other cases, a cryptographic key may be used to protect the data on the hard disk of the electronic device. The cryptographic key may be stored on a USB drive which needs to be physically connected to the electronic device to transmit the cryptographic key. However, due to electromagnetic signals that are generated during the transmission of the cryptographic key from the USB drive to the electronic device, the transmitted key may still be obtained by a third party.

Therefore a problem in such cryptographic data protection is the transmission of the secret key to the electronic device.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The following documents provide background material relating to the technological background of the present invention: WO2015/175854 A2, CN103440209 B, US2007055880, US2010023771, DE102010002241, US2012011362, US2012100833, US2012331287, WO2013053058, U.S. Pat. No. 8,522,011, US2014082358, US2015213433 and EP2975570.

SUMMARY

The invention may provide a computer implemented method. It may provide a security method. It may provide a method of encrypting data at an electronic device (S), the electronic device being associated with a key device (C). The electronic device may be further associated with a first asymmetric cryptography pair having a first electronic device private key ($V_{1S}$) and a first electronic device public key ($P_{1S}$), and the key device may be associated with a second asymmetric cryptography pair having a first key device private key ($V_{1C}$) and a first key device public key ($P_{1C}$);

The method may comprise the steps of:
determining, at the electronic device, a deterministic key (DK);
receiving, at the electronic device, the first key device public key ($P_{1C}$) from the key device;
determining, at the electronic device, a second electronic device private key ($V_{2S}$) based on at least the first electronic device private key ($V_{1S}$) and the deterministic key (DK), and
determining, at the electronic device, a second key device public key ($P_{2C}$) based on at least the first key device public key ($P_{1C}$) and the deterministic key (DK);
determining a secret based on at least the second electronic device private key ($V_{2S}$) and the second key device public key ($P_{2C}$);
encrypting the data at the electronic device using the determined secret or an encryption key that is based on the determined secret; and/or
sending information indicative of the deterministic key (DK) to the key device where the information can be stored.

The method may further comprise storing, at the key device, the information indicative of the deterministic key (DK).

The deterministic key (DK) may be based on a message (M). The method may comprise a step of generating the message (M) at the electronic device. The method may further comprise determining the deterministic key (DK) based on determining a hash of the message (M). The step of storing information indicative of the deterministic key on the key device may comprise storing the message (M) on the key device.

The method may comprise determining a second electronic device public key ($P_{2S}$) based on at least the first electronic device public key ($P_{1S}$) and the deterministic key (DK).

The method may also comprise: sending from the electronic device to the key device, a notice indicative of using a common elliptic curve cryptography (ECC) system with a common generator (G).

The first electronic device public key ($P_{1S}$) and the first key device public key ($P_{1C}$) may be based on elliptic curve point multiplication of the respective first electronic device private key ($V_{1S}$) and first key device private key ($V_{1C}$) and the common generator (G).

The method may comprise generating the first electronic device private key ($V_{1S}$) and the first electronic device public key ($P_{1S}$). For example, the first electronic device private key ($V_{1S}$) may be generated based on a random integer in an allowable range specified in the common ECC system; and the first electronic device public key ($P_{1S}$) may be generated based on elliptic curve point multiplication of the first electronic device private key ($V_{1C}$) and the common generator (G) according to the following formula:

$$P_{1S} = V_{1S} \times G$$

The second electronic device private key ($V_{2S}$) may be based on a scalar addition of the first electronic device private key ($V_{1S}$) and the deterministic key (DK) according to the following formula:

$$V_{2S}=V_{1S}+DK$$

The second electronic device public key ($P_{2S}$) may be based on at least the first electronic device public key ($P_{1S}$) with elliptic curve point addition to the deterministic key (DK). In a specific example, the second electronic device public key ($P_{2S}$) may be based on the first electronic device public key ($P_{1S}$) with elliptic curve point addition to the elliptic curve point multiplication of the deterministic key (DK) and the common generator (G) according to the following formula:

$$P_{2S}=P_{1S}+DK \times G.$$

The second key device public key ($P_{2C}$) may be based on at least the first key device public key ($P_{1C}$) with elliptic curve point addition to the deterministic key (DK). In a specific example, the second key device public key ($P_{2C}$) may be based on the first key device public key ($P_{1C}$) with elliptic curve point addition to the elliptic curve point multiplication of the deterministic key (DK) and the common generator (G) according to the following formula:

$$P_{2C}=P_{1C}+DK \times G$$

The method may comprise determining the encryption key based on the determined secret. For example, the encryption key may be based on the secret and identification information of the electronic device. The identification information may comprise a serial number of the electronic device.

The method may comprise connecting the electronic device with the key device to be in communication with each other. For example, the electronic device may be connected to the key device via a wireless protocol, such as Bluetooth or a communications network, for example the internet, or a local communications network. Alternatively, the electronic device may be connected to the key device by virtue of a wire, for example via cable or a suitable port of the electronic device.

The method may further comprise storing, at a data storage associated with the electronic device, the first key device public key ($P_{1C}$).

Additionally or alternatively, the invention may provide a computer implemented method of decrypting data at an electronic device, the data being encrypted in accordance with the method of encrypting data as described above, the method of decrypted the data comprising:

receiving, at the electronic device, the information indicative of the deterministic key (DK), from the key device;

determining the secret based on the received information indicative of the deterministic key (DK); and decrypting, at the electronic device, the encrypted data using the secret or the encryption key that is based on the secret.

The method may comprise authenticating the key device. For this, the method may comprise generating, at the electronic device, an authentication message ($M_A$) and sending the authentication message ($M_A$) to the key device.

The method may comprise generating, at the key device, a second asymmetric cryptography pair having a second key device private key ($V_{2C}$) and a second key device public key ($P_{2C}$). The second key device private key ($V_{2C}$) may be based on a deterministic authentication key ($DK_A$) and the first key device private key ($V_{1C}$). The second key device public key ($P_{2C}$) may be based on the deterministic authentication key ($DK_A$) and the first key device public key ($P_{1C}$).

The method may comprise determining the deterministic authentication key ($DK_A$). For example, the deterministic authentication key ($DK_A$) may be determined based on the authentication message ($M_A$), such as by determining a hash of the message ($M_A$).

The method may include generating, at the key device, a signed authentication message ($SM_A$) based on the deterministic authentication key ($DK_A$) and the second key device private key ($V_{2C}$).

The method may further include: receiving, at the electronic device, the signed authentication message ($SM_A$) from the key device; validating the signed message ($SM_A$) with the second key device public key ($P_{2C}$); and authenticating the key device based on the result of validating the signed authentication message ($SM_A$).

The method of decrypting the data may comprise requesting, at the electronic device, the information indicative of the deterministic key (DK) from the key device. In embodiments in which the information indicative of the deterministic key (DK) comprises the message (M), in response to receiving the request at the key device, the key device may generate a signed message (SM) based on the message (M) and send the signed message (SM) to the electronic device. The signed message (SM) may be generated based on the message (M) and the first or second key device private key.

The method of decrypting the data may further comprise validating, at the electronic device, the signed message (SM) and retrieving the message (M) such that the secret can be determined, at the electronic device, for decrypting the data.

The invention may also provide a computer-implemented system for implementation any aspect or embodiment of the method(s) described above. It may provide a computer system for encrypting data at an electronic device, the computer system comprising:

the electronic device being associated with a first asymmetric cryptography pair having a first electronic device private key ($V_{1S}$) and a first electronic device public key ($P_{1S}$), a key device being associated with a second asymmetric cryptography pair having a first key device private key ($V_{1C}$) and a first key device public key ($P_{1C}$);

wherein the electronic device comprises a processor configured to:

determine a deterministic key (DK);

receive the first key device public key ($P_{1C}$) from the key device;

determine a second electronic device private key ($V_{2S}$) based on at least the first electronic device private key ($V_{1S}$) and the deterministic key (DK), and determine a second key device public key ($P_{2C}$) based on at least the first key device public key ($P_{1C}$) and the deterministic key (DK);

determine a secret based on at least the second electronic device private key ($V_{2S}$) and the second key device public key ($P_{2C}$); and encrypt the data on the electronic device using the determined secret or an encryption key that is based on the determined secret;

wherein information indicative of the deterministic key (DK) is stored on the key device.

The deterministic key (DK) may be based on a message (M). The processor may be configured to generate the message (M). The processor may further be configured to determine the deterministic key (DK) based on determining a hash of the message (M).

The processor may be configured to determine a second electronic device public key ($P_{2S}$) based on at least the first electronic device public key ($P_{1S}$) and the deterministic key (DK).

In the system, the electronic device may comprise an interface and the key device may comprise a key device interface to establish communication between the electronic device and the key device. For example, the electronic device may be connected to the key device via a wireless protocol, such as Bluetooth or a communications network, for example the internet, or a local communications network. Alternatively, the electronic device may be connected to the key device by virtue of a wire, for example via cable or a suitable port of the electronic device.

The interface of the electronic device may be configured to send a notice indicative of using a common elliptic curve cryptography (ECC) system with a common generator (G) to the key device interface of the associated key device.

The first electronic device public key ($P_{1S}$) and the first key device public key ($P_{1C}$) may be based on elliptic curve point multiplication of respective first electronic device private key ($V_{1S}$) and first key device private key ($V_{1C}$) and a generator (G).

The processor may be configured to generate the first electronic device private key ($V_{1S}$) and the first electronic device public key ($P_{1S}$). For example, the first electronic device private key ($V_{1S}$) may be generated based on a random integer in an allowable range specified in the common ECC system; and the first electronic device public key ($P_{1S}$) may be generated based on elliptic curve point multiplication of the first electronic device private key ($V_{1C}$) and the common generator (G) according to the following formula:

$$P_{1S}=V_{1S}\times G$$

The second electronic device private key ($V_{2S}$) may be based on a scalar addition of the first electronic device private key ($V_{1S}$) and the deterministic key (DK) according to the following formula:

$$V_{2S}=V_{1S}+DK$$

The second electronic device public key ($P_{2S}$) may be based on at least the first electronic device public key ($P_{1S}$) with elliptic curve point addition to the deterministic key (DK). In a specific example, the second electronic device public key ($P_{2S}$) may be based on the first electronic device public key ($P_{1S}$) with elliptic curve point addition to the elliptic curve point multiplication of the deterministic key (DK) and the common generator (G) according to the following formula:

$$P_{2S}=P_{1S}+DK\times G.$$

The second key device public key ($P_{2C}$) may be based on at least the first key device public key ($P_{1C}$) with elliptic curve point addition to the deterministic key (DK). In a specific example, the second key device public key ($P_{2C}$) may be based on the first key device public key ($P_{1C}$) with elliptic curve point addition to the elliptic curve point multiplication of the deterministic key (DK) and the common generator (G) according to the following formula:

$$P_{2C}=P_{1C}+DK\times G$$

The processor may be configured to determine the encryption key based on the determined secret. For example, the encryption key may be based on the determined secret and identification information of the electronic device. The identification information may comprise a serial number of the electronic device.

The electronic device may comprise a data storage in which the first key device public key ($P_{1C}$) may be stored.

The key device may comprise a key device data storage for storing at least the information indicative of the deterministic key.

The computer system as described above further configured to decrypt data, the processor of the electronic device being configured to:

receive the information indicative of the deterministic key (DK), from the key device;

determine the secret based on the information indicative of the deterministic key (DK); and decrypt the data using the determined secret or the encryption key that is based on the determined secret.

The processor may be configured to authenticate the key device. For this, the processor may generate an authentication message ($M_A$) and send the authentication message ($M_A$) to the key device.

The key device may comprise a key device processor that may be configured to generate a second asymmetric cryptography pair having a second key device private key ($V_{2C}$) and a second key device public key ($P_{2C}$). The second key device private key ($V_{2C}$) may be based on a deterministic authentication key ($DK_A$) and the first key device private key ($V_{1C}$). The second key device public key ($P_{2C}$) may be based on the deterministic authentication key ($DK_A$) and the first key device public key ($P_{1C}$).

The key device processor may further be configured to determine the deterministic authentication key ($DK_A$). For example, the deterministic authentication key ($DK_A$) may be determined based on the authentication message ($M_A$), such as by determining a hash of the message ($M_A$).

The key device processor may be configured to generate a signed authentication message ($SM_A$) based on the deterministic authentication key ($DK_A$) and the second key device private key ($V_{2C}$).

The processor of the electronic device may be configured to: receive the signed authentication message ($SM_A$) from the key device; validate the signed message ($SM_A$) with the second key device public key ($P_{2C}$); and authenticate the key device based on the result of validating the signed authentication message ($SM_A$).

The processor of the electronic device may request the information indicative of the deterministic key (DK) from the key device. In embodiments in which the information indicative of the deterministic key (DK) comprises the message (M), in response to receiving the request at the key device, the key device processor may generate a signed message (SM) based on the message (M) and send the signed message (SM) to the electronic device. The signed message (SM) may be generated based on the message (M) and the first or second key device private key.

The processor of the electronic device may further be configured to validate the signed message and retrieving the message (M) such that the secret can be determined for decrypting the data.

An electronic device for encrypting data, the electronic device being associated with a key device, wherein the electronic device is associated with a first asymmetric cryptography pair having a first electronic device private key ($V_{1S}$) and a first electronic device public key ($P_{1S}$), and the key device is associated with a second asymmetric cryptography pair having a first key device private key ($V_{1C}$) and a first key device public key ($P_{1C}$); the electronic device comprising a processing device configured to:

determine a deterministic key (DK);
receive the first key device public key ($P_{1C}$) from the associated key device;
determine a second electronic device private key ($V_{2S}$) based on at least the first electronic device private key ($V_{1S}$) and the deterministic key (DK), and
determine a second key device public key ($P_{2C}$) based on at least the first key device public key ($P_{1C}$) and the deterministic key (DK);
determine a secret based on at least the second electronic device private key ($V_{2S}$) and the second key device public key ($P_{2C}$); and
encrypt the data on the electronic device using the determined secret or an encryption key that is based on the determined secret;
wherein information indicative of the deterministic key (DK) is sent to the key device where it can be stored.

A computer program comprising machine-readable instructions to cause a processing device of an electronic device to implement any one of the methods described above.

One or more embodiments or aspects of the invention may comprise or use a computer-implemented method of determining, at a first node (C), a common secret (CS) that is common with the first node (C) and a second node (S). The first node (C) may be associated with a first asymmetric cryptography pair having a first node master private key ($V_{1C}$) and a first node master public key ($P_{1C}$), and the second node (S) may be associated with a second asymmetric cryptography pair having a second node master private key ($V_{1S}$) and a second node master public key ($P_{1S}$). The method may comprise:
  determining a first node second private key ($V_{2C}$) based on at least the first node master private key ($V_{1C}$) and a deterministic key (DK);
  determining a second node second public key ($P_{2S}$) based on at least the second node master public key ($P_{1S}$) and the deterministic key (DK); and
  determining the common secret (CS) based on the first node second private key ($V_{2C}$) and the second node second public key ($P_{2S}$),
  wherein the second node (S) has the same common secret (S) based on a first node second public key ($P_{2C}$) and a second node second private key ($V_{2S}$), wherein:
  the first node second public key ($P_{2C}$) is based on at least the first node master public key ($P_{1C}$) and the deterministic key (DK); and
  the second node second private key ($V_{2S}$) is based on at least the second node master private key ($V_{1S}$) and the deterministic key (DK).

The deterministic key (DK) is based on a message (M).

Thus, the invention may provide techniques and devices for enhanced security of electronic devices and/or the data stored thereon. The invention may also provide an improved electronic device because of the enhanced security mechanisms of the invention.

BRIEF DESCRIPTION OF DRAWINGS

Examples of the present disclosure will be described with reference to.

DESCRIPTION OF EMBODIMENTS

Overview

A method, device and system to encrypt data at an electronic device will now be described.

Figure 1:
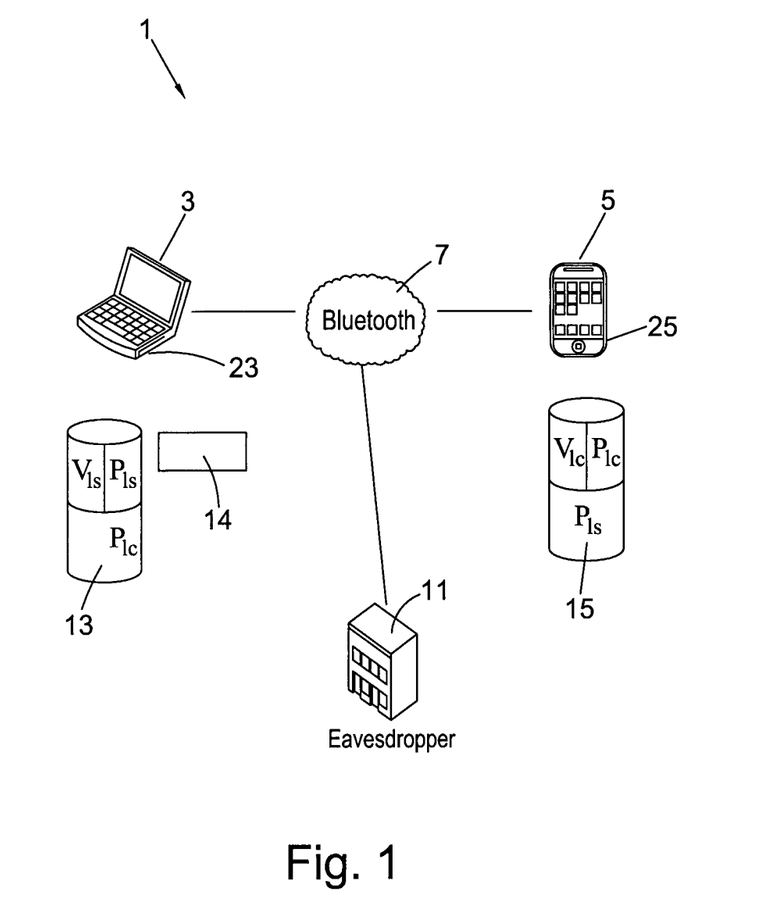
FIG. 1 is a schematic diagram of an example system to encrypt data.

FIG. 1 illustrates a computer system 1 that includes an electronic device 3 that is in communication with a key device 5. The electronic device 3 has an associated first processing device 23 and the key device 5 has an associated second processing device 25. The electronic device 3 may be a personal electronic device, such as a laptop computer, a desk computer, a tablet computer, a mobile communication device, a computer server or any other computing device capable of processing data. In this particular example as illustrated in FIG. 1, the electronic device 3 is represented by a laptop computer.

The key device 5 may be a further personal electronic device, such as a mobile communication device, a portable memory device, such as a USB drive or the like. In this particular example as illustrated in FIG. 1, the key device 5 is represented by a mobile communication device.

The electronic device 3 may be in communication with the key device 5 via a wireless protocol, such as Bluetooth or a communications network, for example the internet or a local communications network. Alternatively, the electronic device 3 may be physically connected to the key device 5, for example via a USB port of the electronic device or via a cable connection. In this particular example as illustrated in FIG. 1, the electronic device 3 is in communication with the key device 5 via Bluetooth 7.

The electronic device 3 is associated with a first asymmetric cryptography pair having an electronic device master private key ($V_{1S}$) and an electronic device master public key ($P_{1S}$). The key device 5 is associated with a second asymmetric cryptography pair having a key device master private key ($V_{1C}$) and a key device master public key ($P_{1C}$). The first and second asymmetric cryptography pairs may be generated during registration. Methods of registration 200, 300 performed by the electronic device 3 and the key device 5 will be described in further detail below with reference to FIG. 2. The public key for each device may be shared between the devices 3, 5 publicly, for example via Bluetooth 7.

Embodiments of the present invention may comprise a technique (or variation(s) thereof) which is generally provided as: determining, at a first node (C), a common secret (CS) that is common with the first node (C) and a second node (S), wherein the first node (C) is associated with a first asymmetric cryptography pair having a first node master private key ($V_{1C}$) and a first node master public key ($P_{1C}$), and the second node (S) is associated with a second asymmetric cryptography pair having a second node master private key ($V_{1S}$) and a second node master public key ($P_{1S}$); the method or technique comprising:

determining a first node second private key ($V_{2C}$) based on at least the first node master private key ($V_{1C}$) and a deterministic key (DK);

determining a second node second public key ($P_{2S}$) based on at least the second node master public key ($P_{1S}$) and the deterministic key (DK); and determining the common secret (CS) based on the first node second private key ($V_{2C}$) and the second node second public key ($P_{2S}$), wherein the second node (S) has the same common secret (S) based on a first node second public key ($P_{2C}$) and a second node second private key ($V_{2S}$), wherein:

the first node second public key ($P_{2C}$) is based on at least the first node master public key ($P_{1C}$) and the deterministic key (DK); and the second node second private key ($V_{2S}$) is based on at least the second node master private key ($V_{1S}$) and the deterministic key (DK).

The deterministic key (DK) may be based on a message (M).

In accordance with an illustrative embodiment of the present invention: to encrypt data at the electronic device 3, a secret is determined based on a technique similar to that described above. The secret is determined on a private cryptography key of the electronic device 3 and a public cryptography key of the key device 5. By determining the secret, data can be encrypted using an encryption key (E) that is based on the determined secret. In one or more examples, the secret may be used as the encryption key (E). One of the advantages of this technique is that there is no need for transmitting or storing the secret or the encryption key (E) on any of the devices 3, 5. This provides a much more secure solution compared to prior art arrangements.

Figure 3:
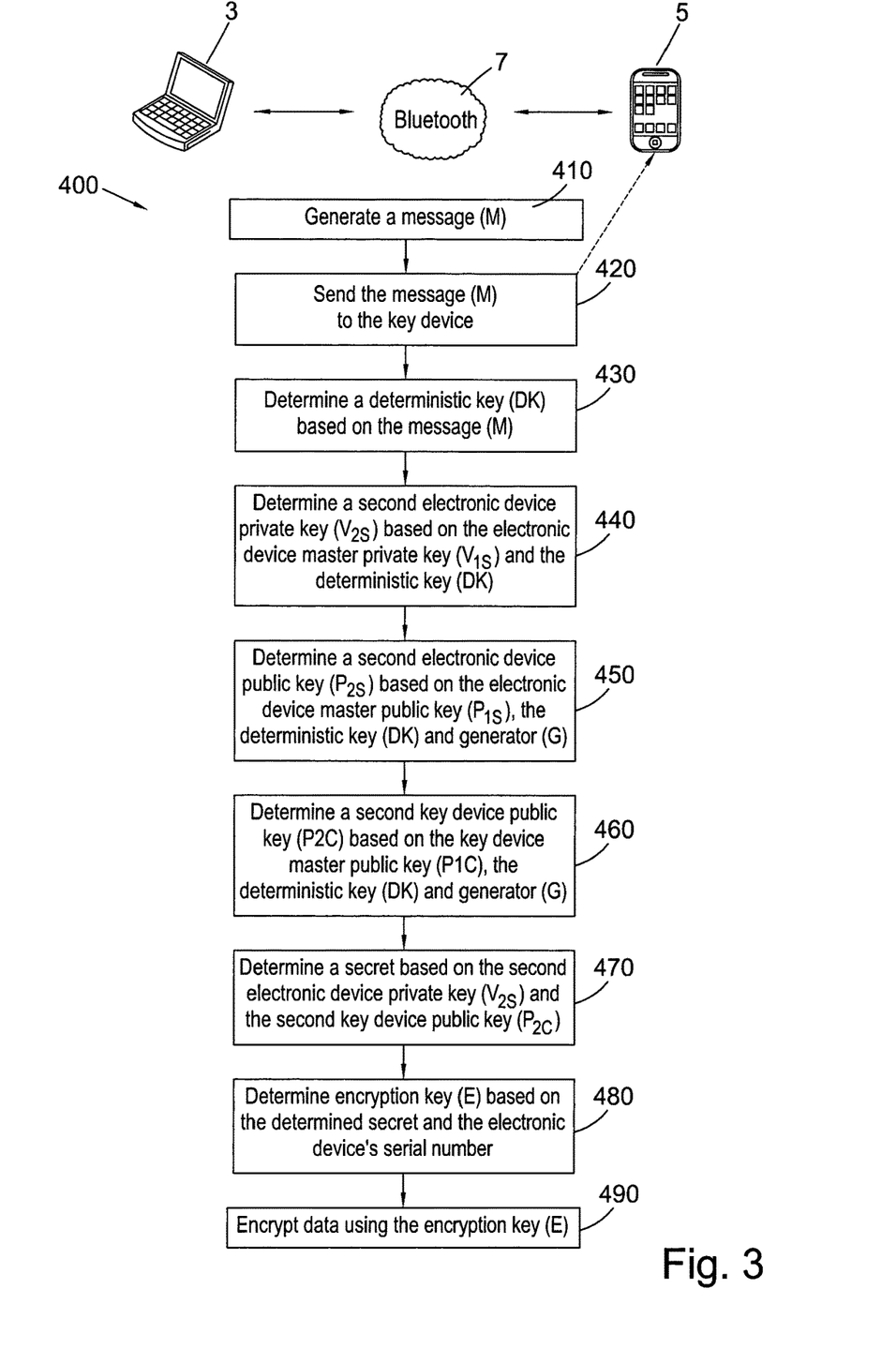
FIG. 3 is a flow chart of a computer-implemented method for encrypting data at the electronic device of FIG. 1 using a secret.

To encrypt the data using the secret at the electronic device 3, the method 400 is performed without communicating any of the private keys between the devices 3, 5 which will be described in further detail with reference to FIG. 3.

In general, the method of encrypting data performed by the electronic device 3 initially includes connecting the electronic device 3 with a key device 5 to communicate with the key device 5. The communication may be established through a wired connection or a wireless connection, such as Bluetooth 7.

The method further includes determining a deterministic key (DK) which may be based on a message (M) created by the electronic device 3. For example, the processing device 23 of the electronic device 3 may generate a message (M) and then uses a standard algorithm to create a hash of the message forming the deterministic key (DK).

The method further includes determining a second electronic device private key ($V_{2S}$) based on at least the electronic device master private key ($V_{1S}$) and the deterministic key (DK), and determining a second key device public key ($P_{2C}$) based on the key device master public key ($P_{1C}$) and the deterministic key (DK). A secret is then determined based on the second electronic device private key ($V_{2S}$) and the second key device public key ($P_{2C}$). Optionally, the method may include determining a second electronic device public key ($P_{2S}$) based on at least the electronic device master public key ($P_{1S}$) and the deterministic key (DK).

In a further method step, data can then be encrypted using an encryption key (E) that is based on the determined secret. As mentioned above, the determined secret itself may be used as encryption key (E), or the encryption key (E) may be determined based on the secret. Following encrypting the data on the electronic device, the secret may be erased and only the deterministic key (DK) or the message (M) may be sent to the key device 5 where it can be securely stored. The deterministic key (DK) or the message (M) stored on the key device 5 can subsequently be used to decrypt the encrypted data.

It will be appreciated that the data to be encrypted/decrypted may comprise one or more individual files, one or more folders comprising files or an entire hard drive of the electronic device. In some examples, the method may comprise prompting a user to select the files and/or folders that are to be encrypted/decrypted. In such case, the key device 5 may store information indicative of a deterministic key for each file and folder and link them accordingly.

Method of Registration 200, 300

Figure 2:
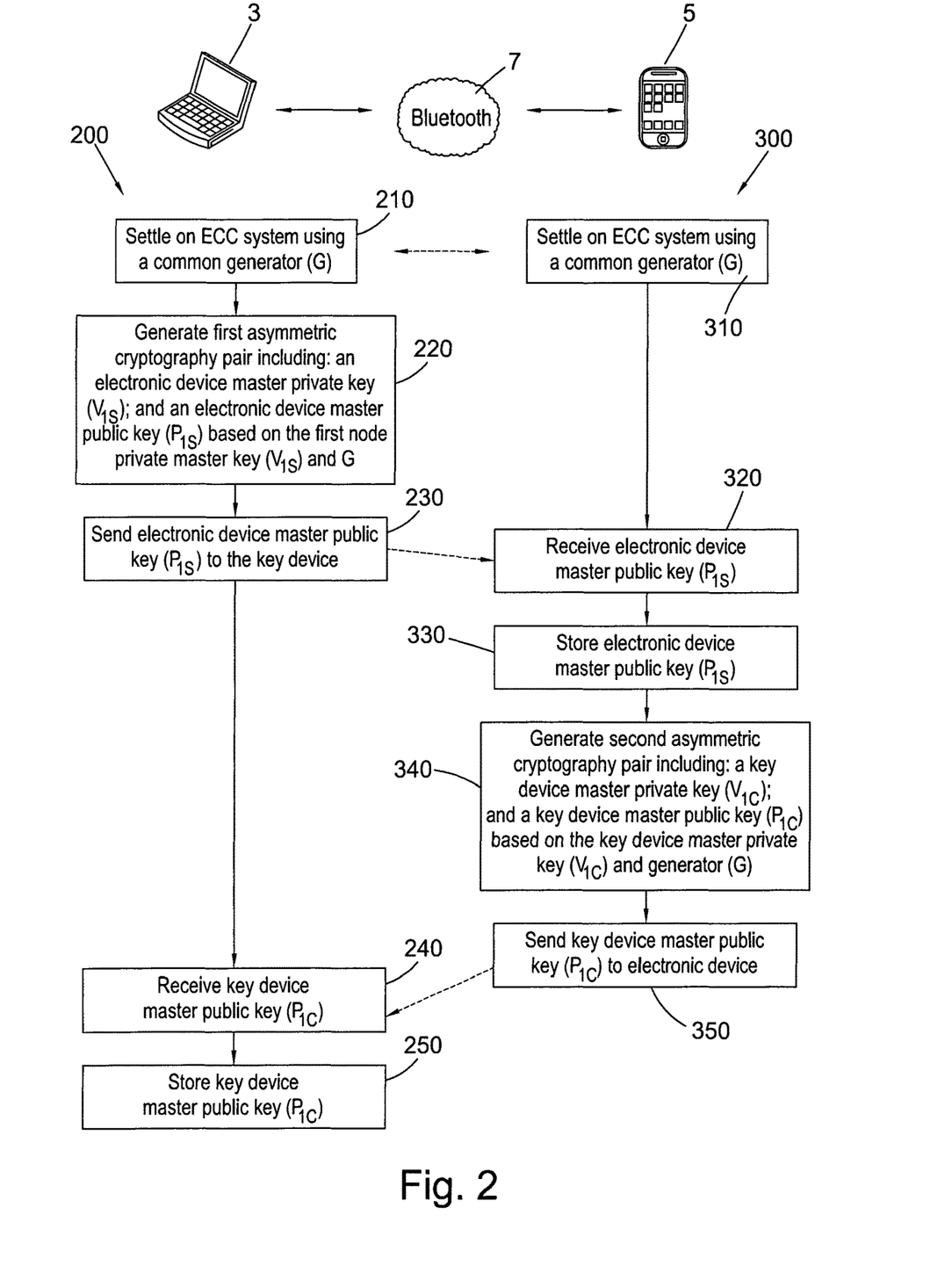
FIG. 2 is a flow chart of computer-implemented methods for registering the electronic device and the key device of FIG. 1.

An example of methods of registration 200, 300 will be described with reference to FIG. 2, where method 200 is performed by the electronic device 3 and method 300 is performed by the key device 5. This includes establishing the first and second asymmetric cryptography pairs for the respective devices 3, 5.

The asymmetric cryptography pairs include associated private and public keys, such as those used in public-key encryption. In this example, the asymmetric cryptography pairs are generated using Elliptic Curve Cryptography (ECC) and properties of elliptic curve operations.

Standards for ECC may include known standards such as those described by the Standards for Efficient Cryptography Group (www.sceg.org). Elliptic curve cryptography is also described in U.S. Pat. Nos. 5,600,725, 5,761,305, 5,889,865, 5,896,455, 5,933,504, 6,122,736, 6,141,420, 6,618,483, 6,704,870, 6,785,813, 6,078,667, 6,792,530.

In the method 200, 300, this includes the electronic device 3 and the key device 5 settling 210, 310 to a common ECC system and using a common generator (G). In one example, the common ECC system may be based on secp256K1 which is an ECC system used by Bitcoin. The common generator (G) may be selected, randomly generated, or assigned.

In the specific example illustrated in FIG. 1 in which the electronic device 3 is a laptop computer and the key device 5 is a mobile communication device, communications between the respective devices 3, 5 are realised by an application programming interface (API) communicating with a dedicated application installed on the mobile communications device 5. For this, software may be downloaded and installed on the laptop computer which is compatible with the dedicated application installed on the mobile communication device.

In a specific example, the key device 5 may be provided with not only the software application for the key device but also with the software for the electronic device. In this way, when the key device is connected to the electronic device, the software can be installed on the electronic device by executing the installation from the key device.

Turning now to the method 200 performed by the electronic device 3, the method 200 includes settling 210 on the common ECC system and common generator (G). This may include sending information indicative of the common ECC system and common generator from the electronic device 3 to the key device 5, or receiving the information from a third device, such as remote server computer. For example, the electronic device 3 may send, via Bluetooth 7, a notice indicative of using the common ECC system with a common generator (G) to the key device 5. In turn, the key device 5 may settle 310 by sending a notice indicative of an acknowledgment to using the common ECC system and common generator (G).

The method 200 also includes generating 220, at the electronic device 3, a first asymmetric cryptography pair that includes the electronic device master private key ($V_{1S}$) and the electronic device master public key ($P_{1S}$). In this particular example, the electronic device master private key ($V_{1S}$) is determined based, at least in part, on a random integer in an allowable range specified in the common ECC system. The electronic device master public key ($P_{1S}$) is then determined based on elliptic curve point multiplication of the electronic device master private key ($P_{1S}$) and the common generator (G) according to the formula:

$$P_{1S} = V_{1S} \times G \qquad \text{(Equation 1)}$$

Thus the first asymmetric cryptography pair includes:

$V_{1S}$: The electronic device master private key that is kept secret by the electronic device.

$P_{1S}$: The electronic device master public key that is made publicly known.

The electronic device 3 may store the first asymmetric cryptography pair in a first data storage 13 associated with the electronic device 3. For security, the electronic device master private key ($V_{1S}$) may be stored in a secure portion of the first data storage 13 to ensure the key remains private.

In this example, the method 200 includes sending 230 the electronic device public master key ($P_{1S}$) to the key device 5. However, for encrypting the data on the electronic device 3, this step may not be necessary.

Turning now to the method 300 performed by the key device 5, in this specific example the key device 5 receives 320 the electronic device master public key ($P_{1S}$) and stores 330 the received electronic device master public key ($P_{1S}$) within a storage element of the key device 5.

Similar to the method 200, the method 300 at the key device 5 includes generating 340 a second asymmetric cryptography pair that includes the key device master private key ($V_{1C}$) and the key device master public key ($P_{1C}$). The key device master private key ($V_{1C}$) is also a random integer within the allowable range specified in the common ECC system. In turn, the key device master public key ($P_{1C}$) is determined by the following formula:

$$P_{1C} = V_{1C} \times G \qquad \text{(Equation 2)}$$

Thus the second asymmetric cryptography pair includes:

$V_{1C}$: The key device master private key that is kept secret by the key device.

$P_{1C}$: The key device master public key that is made publicly known.

The key device 5 may store the second asymmetric cryptography pair in a second data store 15 of the key device. The method 300 further includes sending 330 the key device master public key ($P_{1C}$) to the electronic device 3 where it may be stored in storage 13.

In some alternatives, the respective public master keys may be received and stored at a third data store associate with a third device, such as a trusted third party. This may include a third party that acts as a public directory, such as a certification authority. Thus in some examples, the key device master public key ($P_{1C}$) may be requested and received by the electronic device 3 only when determining the secret is required.

The registration steps may only need to occur once as an initial setup. Afterwards, the master keys can be reused in a secure matter to determine the secret that is dependent, inter alia, on the deterministic key (DK).

Encryption of Data at the Electronic Device 3

An exemplary method 400 of encrypting data at the electronic device 3 by determining a secret that is based on a private key of the electronic device 3 and a public key of the key device 5 will now be described with reference to FIG. 3. The secret may be used for one cycle only, each cycle being a full round of encryption and decryption of the data.

It will be appreciated that new private and public keys may be determined for both the electronic device and the key device for each cycle of encryption and decryption. The new private and public keys may for example be determined by re-hashing the message (M) as described in further detail in the co-filed application as mentioned above which is herein incorporated by reference in its entirety. In this way, sub-keys may be created, wherein each sub-key is linked to the master key.

Generating a Message (M) 410

In this example, the method 400 includes generating 410 a message (M) at the electronic device 3. The message (M) may be random, pseudo random, or user defined. In one example, the message (M) is based on Unix time and a nonce (and arbitrary value). For example, the message (M) may be provided as:

$$\text{Message } (M) = \text{Unix Time} + \text{nonce} \qquad \text{(Equation 3)}$$

In some examples, the message (M) is arbitrary. However it is to be appreciated that the message (M) may have selective values (such as Unix Time, etc.) that may be useful in some applications.

The method 400 includes sending 420 the message (M) via Bluetooth 7, to the key device 5 where the message (M) will be stored. Importantly, the message (M) may be sent to the key device 5 over an unsecure network as the message (M) does not include information on the private keys.

It will be appreciated that the message (M) may be communicated to the key device 5 at any time. For example, the message (M) may be sent to the key device 5 after the encryption of the data is completed.

Determining a Deterministic Key 430

The method 400 further includes the step of determining 430 a deterministic key (DK) based on the message (M). In this example, this includes determining a cryptographic hash of the message. An example of a cryptographic hash algorithm includes SHA-256 to create a 256-bit deterministic key (DK). That is:

$$DK = \text{SHA-256}(M) \qquad \text{(Equation 4)}$$

The selection of message may be arbitrary for the purpose of generating the encryption key (E) and will be newly selected for each encryption/decryption cycle. In this example, the message (M) is reduced to 160 bits by hashing in order to keep the message length short.

It is to be appreciated that other hash algorithms may be used. This may include other hash algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may be based on Zémor-Tillich hash function and knapsack-based hash functions.

Determining Second Private and Public Keys 440, 450, 460

The method 400 then includes determining 440, 450, 460 the following second keys based on the deterministic key (DK), i.e. the hash of the message (M).

The second electronic device private key ($V_{2S}$) is determined 440 based on the electronic device master private key ($V_{1S}$) and the hash of the message (M). This can be based on a scalar addition of the electronic device master private key ($V_{1S}$) and the hash of the message (M) according to the following formula:

$$V_{2S}=V_{1S}+\text{SHA-256}(M) \quad \text{(Equation 5)}$$

The second electronic device public key ($P_{2S}$) is determined 450 based on the electronic device master public key ($P_{1S}$) and the hash of the message (M). This can be determined based on the following formula:

$$P_{2S}=P_{1S}+\text{SHA-256}(M) \times G \quad \text{(Equation 6)}$$

The second key device public key ($P_{2C}$) is determined 460 based on the key device master public key ($P_{1C}$) and the hash of the message (M). This can be determined according to the following formula:

$$P_{2C}=P_{1C}+\text{SHA-256}(M) \times G \quad \text{(Equation 7)}$$

It should be noted that in this specific example in which elliptic curve cryptography is applied, 'G' refers to the generator, the operator '+' refers to elliptic curve point addition and the operator '×' refers to elliptic curve point multiplication.

Furthermore, it should be noted that for the encryption of the data, it may not be necessary to determine the second electronic device public key $P_{2S}$. As will be described in further detail below, for determining the secret, the second electronic device public key $P_{2S}$ may not be necessary.

Determine the Secret 470

The electronic device 3 may then determine 470 the secret based on the determined second electronic device private key ($V_{2S}$) and the determined second key device public key ($P_{2C}$). The secret may be determined by the electronic device 3 according to the following formula:

$$CS=V_{2C} \times P_{2S} \quad \text{(Equation 8)}$$

The Secret and Encryption Key

The secret may be used as a symmetric encryption key, or as the basis for determining a symmetric encryption key.

In this particular example, the method 400 includes a further step of determining 480 an encryption key (E) based on the determined secret. The encryption key (E) is further based on the electronic device's serial number to ensure that the encryption key (E) is specific to the electronic device 3. The encryption key (E) is determined according to the following formula:

$$E=\text{SHA256 (SHA256 (salt+secret)+serial number)} \quad \text{(Equation 9)}$$

Where salt=message (M)

In this particular example, the concept of random salts is used to determine the encryption key (E). It will be appreciated that any suitable techniques to calculate an encryption key (E) based on the determined secret may be used (if any).

The method 400 further includes encrypting 490 the data, at the electronic device 3, using the determined encryption key (E). It will be appreciated that any suitable method for encrypting the data using the encryption key (E) may be used.

Importantly, the electronic device 3 does not need to store the encryption key (E) or the secret as this can be re-calculated based on the message (M) which is stored on a data storage of the key device 5.

Decryption of the Encrypted Data

Figure 4:
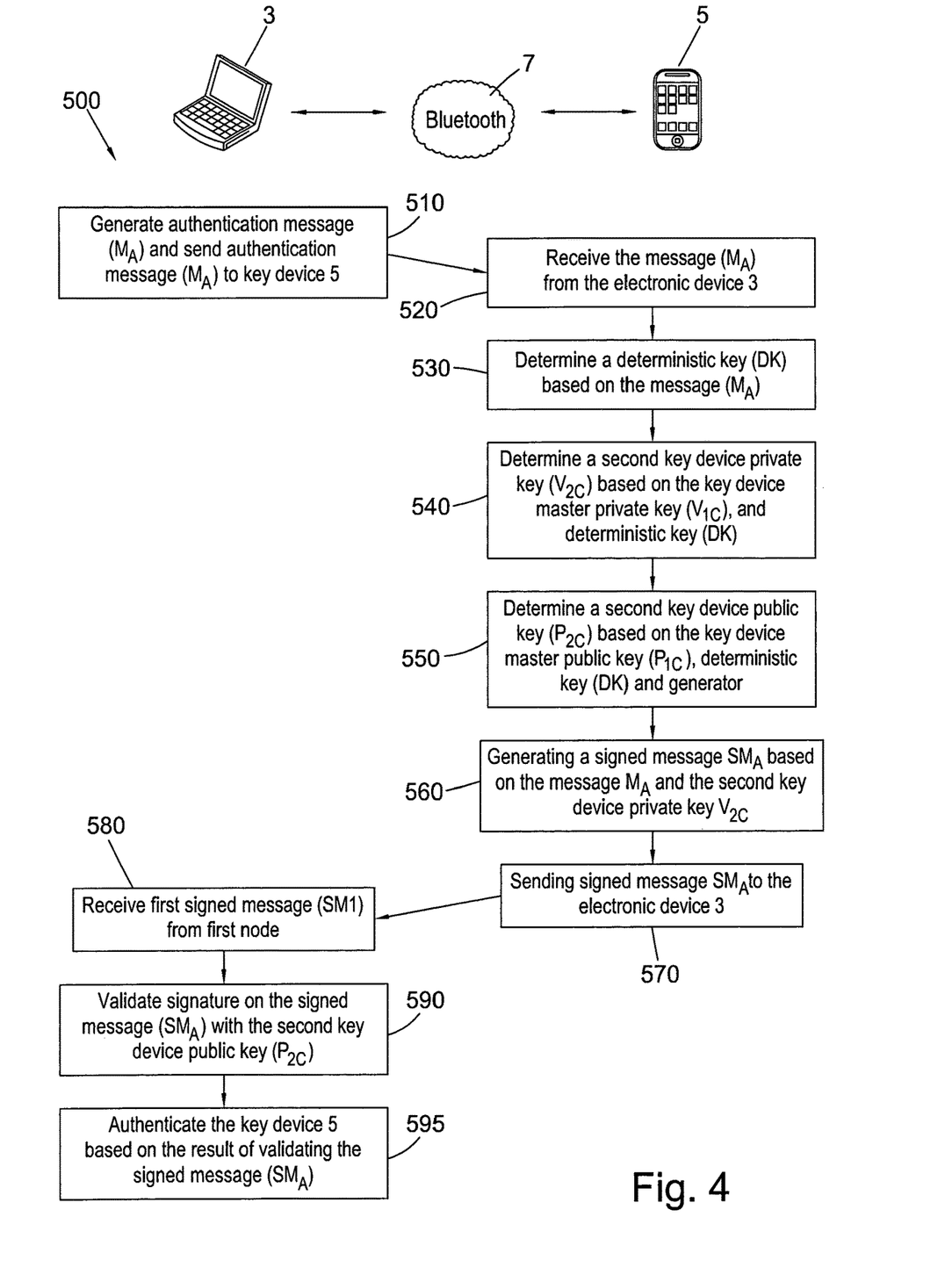
FIG. 4 is a flow chart of a computer-implemented method of authenticating the key device of FIG. 1.
Figure 5:
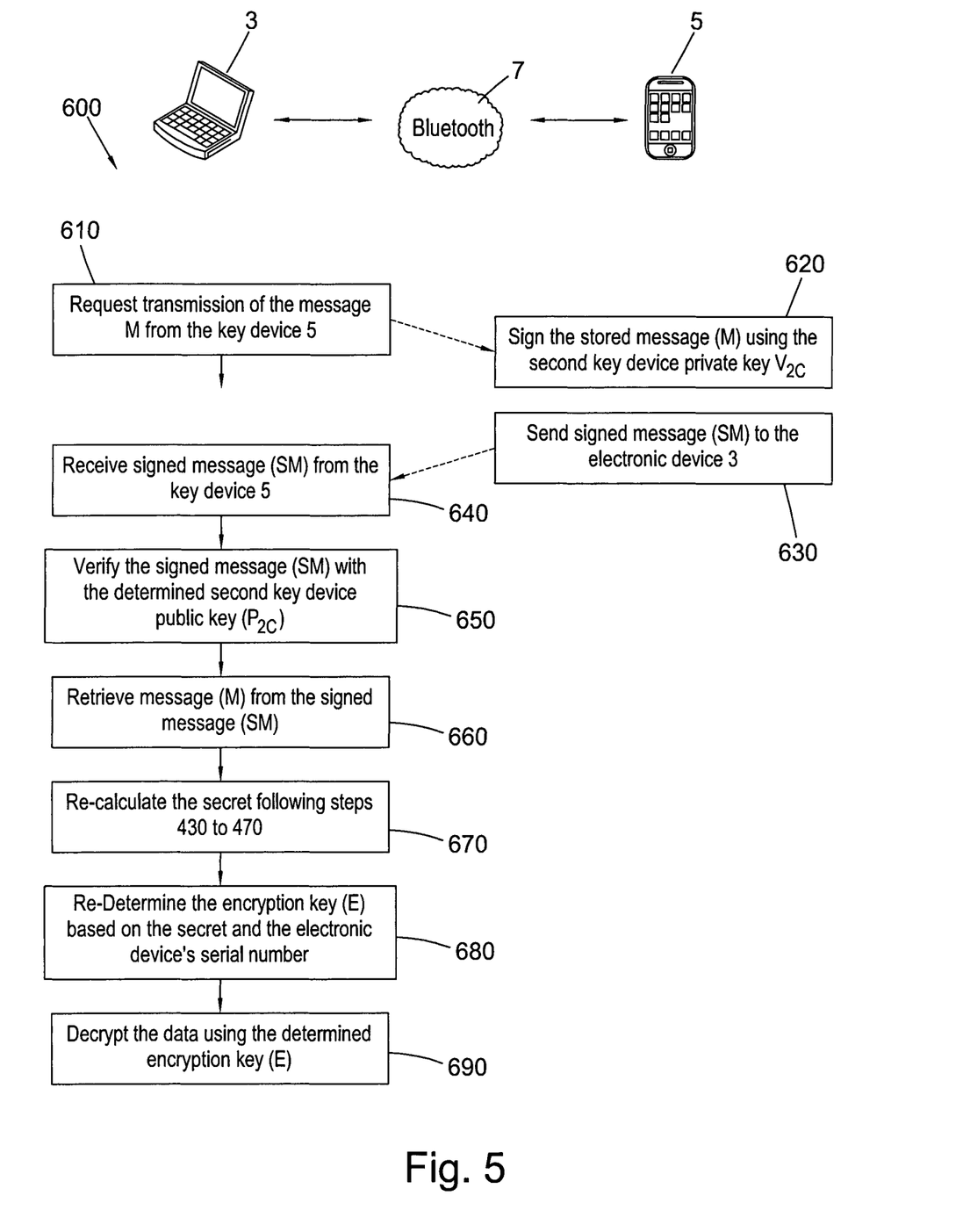
FIG. 5 is a flow chart of a computer implemented method of decrypting the encrypted data at the electronic device following authentication of the key device.

Following the encryption of the data at the electronic device 3, a method of decrypting the encrypted data at the electronic device 3 will now be described with reference to FIGS. 4 and 5. To decrypt the data, the electronic device 3 re-calculates the secret which was previously determined when the data was encrypted.

Initially, the electronic device 3 is connected to the key device 5 to be in communication with each other. The step of connecting the respective devices 3, 5 may include determining whether the respective software running on the devices is compatible and synchronised.

Authenticating 500 the Key Device 5

Before the encrypted data is decrypted at the electronic device 3, in this particular example, the key device 5 is initially authenticated by the electronic device 3.

A method of authenticating 500 the key device 5 will be described with reference to FIG. 4. The method of authenticating 500 the key device 5 may be part of the decryption cycle of the data at the electronic device 3.

The method 500 includes generating 510 an authentication message ($M_A$) at the electronic device 3 which will be used to authenticate that the key device 5 is the key device 5. It will be appreciated that the generated message ($M_A$) may solely be used for the authentication of the key device 5. However, in some examples, the authentication message ($M_A$) may form the message (M) as described with reference to FIG. 3 used in the encryption process for the next encryption-decryption cycle.

The method 500 includes receiving 520 the authentication message ($M_A$) at the key device 5 via Bluetooth 7 from the electronic device 3.

The key device 5 then determines 530 a deterministic authentication key ($DK_A$) based on the message ($M_A$). For example, the deterministic authentication key ($DK_A$) may be the hash of the authentication message similar to step 430 of method 400 and can be determined according to the following formula:

$$DK_A=\text{SHA-256}(M_A) \quad \text{(Equation 10)}$$

The key device 5 then determines a new asymmetric cryptography pair based on the deterministic authentication key ($DK_A$). Specific to this example, the method 500 includes determining 540 a second key device private key $V_{2C}$ according to the following formula:

$$V_{2C}=V_{1C}+\text{SHA-256}(M_A) \quad \text{(Equation 11)}$$

The method 500 also includes determining 550 a second key device public key $P_{2C}$ according to the following formula.

$$P_{2C}=P_{1C}+\text{SHA-256}(M_A) \times G \quad \text{(Equation 12)}$$

The method 300 further includes generating 560 a signed message ($SM_A$) based on the authentication message ($M_A$) and the determined second key device private key ($V_{2C}$). Generating a signed message includes applying a digital signature algorithm to digitally sign the authentication message ($M_A$). In one example, this includes applying the second key device private key ($V_{2C}$) to the message in an Elliptic Curve Digital Signature Algorithm (ECDSA) to obtain the signed message ($SM_A$). The authentication message ($M_A$) may be signed according to the following formula:

Examples of ECDSA include those based on ECC systems with secp256k1, secp256r1, secp384r1, se3cp521r1.

The signed authentication message ($SM_A$) is subsequently sent 570 to the electronic device 3 for authentication of the key device 5.

The method 500 includes receiving 580 the signed authentication message ($SM_A$) from the key device 5. The electronic device 3 may then validate 590 the signature on the signed authentication message ($SM_A$) with the second key device public key ($P_{2C}$) that was determined at step 550.

Verifying the digital signature may be done in accordance with an Elliptic Curve Digital Signature Algorithm (ECDSA). Importantly, the signed authentication message ($SM_A$) that was signed with the second key device private key ($V_{2C}$) should only be correctly verified with the corresponding second key device public key ($P_{2C}$), since $V_{2C}$ and $P_{2C}$ form a cryptographic pair. Since these keys are deterministic of the key device master private key ($V_{1C}$) and the key device master public key ($P_{1C}$) that were generated at registration of the key device, verifying the signed authentication message ($SM_A$) can be used as a basis of authenticating that an alleged key device 5 sending the signed message ($SM_A$) is the same key device 5 as during registration.

Re-Calculate the Encryption Key (E) to Decrypt the Encrypted Data

Following successful authentication of the key device 5, the electronic device 3 decrypts the encrypted data by re-calculating the secret and thereby the encryption key (E). An exemplary method 600 of decrypting the encrypted data will now be described with reference to FIG. 5.

The method 600 includes requesting 610 the message (M) that was previously used in the encryption cycle and stored on the key device 5 as described in step 420 of method 400.

The method 600 then includes receiving 630 message (M). In this particular example, the message (M) is signed 620 by the key device 5 using the second key device private key ($V_{2C}$) before the message (M) is sent to the electronic device 3. The message (M) may be signed according to the following formula:

$$SM = Sig-V_{2C}<M> \quad \text{(Equation 14)}$$

The method 600 further includes verifying 650 the signed message (SM). This may be done by independently determining the second key device public key ($P_{2C}$) and then performing applying an Elliptic Curve Digital Signature Algorithm (ECDSA) to SM and $P_{2C}$. The second key device public key may be determined according to the following formula:

$$P_{2C} = P_{1C} + SHA\text{-}256\,(M) \times G \quad \text{(Equation 15)}$$

The method 600 then includes retrieving 660 the message (M) from the signed message (M) so that the electronic device 3 can re-calculate 670 the secret following steps 430 to 470 as described with reference to FIG. 3.

In a further step 680, the encryption key (E) is re-determined based on the secret and the electronic device's serial number as described with reference to step 480 of method 400. Once the encryption key (E) is determined, the data can be decrypted 690.

It will be appreciated that for decrypting the encrypted data, a method of authentication as described with reference to FIG. 4 may not be necessary for some embodiments.

Processing Device

As noted above, the electronic device 3 and the key device 5 may be personal electronic devices, such as a laptop computer, tablet computer, mobile communication device, computer server etc. The electronic device may include a processing device 23, 25, a data store 13, 15 and a user interface 14.

Figure 6:
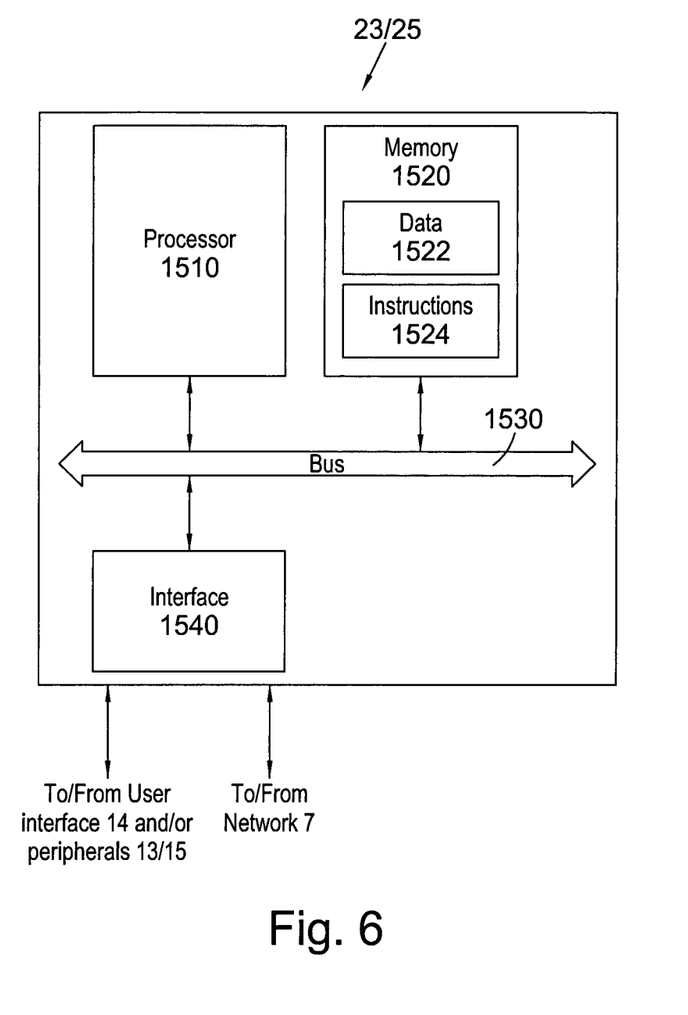
FIG. 6 illustrates a schematic of an example processing device.

FIG. 6 illustrates an example of a processing device 23, 25. The processing device 23, 25 may be used at the electronic device 3, or the key device 5. The processing device 23, 25 includes a processor 1510, a memory 1520 and an interface device 1540 that communicate with each other via a bus 1530. The memory 1520 stores instructions and data for implementing the method 200, 300, 400, 500 and 600 described above, and the processor 1510 performs the instructions from the memory 1520 to implement the method 200, 300, 400, 500 and 600. The interface device 1540, may include a communications module that facilitates communication with the communications network, such as Bluetooth 7 and, in some examples, with the user interface 14 and peripherals such as data store 13, 15. It should be noted that although the processing device 1501 may be independent network elements, the processing device 1501 may also be part of another network element. Further, some functions performed by the processing device 1501 may be distributed between multiple network elements. For example, the electronic device 3 may have multiple processing devices 23 to perform method 200, 400 and parts of method 500, 600 in a secure local area network associated with the electronic device 3.

Where this disclosure describes that a user, issuer, merchant, provider or other entity performs a particular action (including signing, issuing, determining, calculating, sending, receiving, creating etc.), this wording is used for the sake of clarity of presentation. It should be understood that these actions are performed by the computing devices operated by these entities.

Signing may comprise executing a cryptographic function. The function has an input for a clear text and an input for a key, such as a private key. A processor may execute the function to calculate a number or string that can be used as a signature. The signature is then provided together with the clear text to provide a signed text. The signature changes completely if the message text or the key changes by a single bit. While calculating the signature requires little computational power, recreating a message that has a given signature is practically impossible. This way, the clear text can only be changed and accompanied by a valid signature if the private key is available. Further, other entities can easily verify the signature using the publicly available public key.

In most circumstances, encrypting and decrypting comprises a processor executing a cryptographic function to calculate an output string representing the encrypted message or the clear text message respectively.

Keys, tokens, metadata, transactions, offers, contracts, signatures, scripts, metadata, invitations, and the like refer to binary data represented as numbers, text or strings stored on data memory, such as variables in program code of type "string" or "int" or other types or text files.

An example of the peer-to-peer ledger is the bitcoin Blockchain. Transferring funds or paying fees in bitcoin currency comprises creating a transaction on the bitcoin Blockchain with the funds or fees being output from the transaction. An example of a bitcoin transaction includes an input transaction hash, a transaction amount, one or more destinations, a public key of a payee or payees and a signature created by using the input transaction as the input message and a private key of a payer to calculate the signature. The transaction can be verified by checking that the input transaction hash exists in a copy of the bitcoin Blockchain and that the signature is correct using the public key. To ensure that the same input transaction hash has not been used elsewhere already, the transaction is broadcast to a network of computing nodes ('miners'). A miner accepts and records the transaction on the Blockchain only if the input transaction hash is not yet connected and the signatures are valid. A miner rejects the transaction if the input transaction hash is already linked to a different transaction.

When two items are associated, this means that there is a logical connection between these items. In a database, for example, identifiers for the two items may be stored in the same records to make the two items associated with each other. In a transaction, identifiers for the two items may be included in the transaction string to make the two items associated with each other.

Authorising another entity may comprise calculating a signature string of a transaction using a private key and providing the signature string to the entity to allow the entity to use the signature to verify the transaction.

A user having an account with another entity may comprise the entity storing information about the user, such as email address, name and potentially public keys. For example, the entity may maintain a database, such as SQL, OrientDB, MongoDB or others. In some examples, the entity may also store one or more of the user's private keys.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer implemented method of encrypting data at an electronic device (S), the electronic device being associated with a key device (C), wherein the electronic device is further associated with a first asymmetric cryptography pair having a first electronic device private key ($V_{1S}$) and a first electronic device public key ($P_{1S}$), and the key device is associated with a second asymmetric cryptography pair having a first key device private key ($V_{1C}$) and a first key device public key ($P_{1C}$); the method comprising:
   determining, at the electronic device, a deterministic key (DK);
   receiving, at the electronic device, the first key device public key ($P_{1C}$) from the key device;
   determining, at the electronic device, a second electronic device private key ($V_{2S}$) based on at least the first electronic device private key ($V_{1S}$) and the deterministic key (DK), and
   determining, at the electronic device, a second key device public key ($P_{2C}$) based on at least the first key device public key ($P_{1C}$) and the deterministic key (DK);
   determining a secret based on at least the second electronic device private key ($V_{2S}$) and the second key device public key ($P_{2C}$);
   encrypting the data at the electronic device using the determined secret or an encryption key that is based on the determined secret; and
   sending information indicative of the deterministic key (DK) to the key device where the information can be stored.

2. The method of claim 1, further comprising: storing, at the key device, the information indicative of the deterministic key (DK).

3. The method of claim 1, wherein the deterministic key (DK) is based on a message (M).

4. The method of claim 3, comprising a step of generating the message (M) at the electronic device, and determining the deterministic key (DK) based on determining a hash of the message (M).

5. The method of claim 1, comprising a step of determining a second electronic device public key ($P_{2S}$) based on at least the first electronic device public key ($P_{1S}$) and the deterministic key (DK).

6. The method of claim 1, comprising: sending from the electronic device to the key device, a notice indicative of using a common elliptic curve cryptography (ECC) system with a common generator (G).

7. The method of claim 6, comprising a step of generating the first electronic device private key ($V_{1S}$) based on a random integer in an allowable range specified in the common ECC system; and generating the first electronic device public key ($P_{1S}$) based on elliptic curve point multiplication of the first electronic device private key ($V_{1C}$) and the common generator (G) according to the following formula:

$$P_{1S} = V_{1S} \times G.$$

8. The method of claim 6, comprising a step of generating the second electronic device private key ($V_{2S}$) based on a scalar addition of the first electronic device private key ($V_{1S}$) and the deterministic key (DK) according to the following formula:

$$V_{2S} = V_{1S} + DK.$$

9. The method of claim 6, comprising a step of generating the second electronic device public key ($P_{2S}$) based on at least the first electronic device public key ($P_{1S}$) with elliptic curve point addition to the deterministic key (DK).

10. The method of claim 9, wherein the second electronic device public key ($P_{2S}$) is based on the first electronic device public key ($P_{1S}$) with elliptic curve point addition to the elliptic curve point multiplication of the deterministic key (DK) and the common generator (G) according to the following formula:

$$P_{2S} = P_{1S} + DK \times G.$$

11. The method of claim 6, comprising a step of generating the second key device public key ($P_{2C}$) based on at least the first key device public key ($P_{1C}$) with elliptic curve point addition to the deterministic key (DK).

12. The method of claim 11, wherein the second key device public key ($P_{2C}$) is based on the first key device public key ($P_{1C}$) with elliptic curve point addition to the elliptic curve point multiplication of the deterministic key (DK) and the common generator (G) according to the following formula:

$$P_{2C} = P_{1C} + DK \times G.$$

13. The method of claim 1, wherein the first electronic device public key ($P_{1S}$) and the first key device public key ($P_{1C}$) are based on elliptic curve point multiplication of the respective first electronic device private key ($V_{1S}$) and first key device private key ($V_{1C}$) and the common generator (G).

14. The method of claim 1, comprising a step of determining the encryption key based on the determined secret and identification information of the electronic device.

15. The method of claim 1, comprising a step of storing, at a data storage associated with the electronic device, the first key device public key ($P_{1C}$).

16. A computer implemented method of decrypting data at an electronic device, the data being encrypted in accordance with claim 1, the method of decrypted the data comprising:
   receiving, at the electronic device, the information indicative of the deterministic key (DK), from the key device;
   determining the secret based on the received information indicative of the deterministic key (DK); and
   decrypting, at the electronic device, the encrypted data using the secret or the encryption key that is based on the secret.

17. The method of claim 16, comprising a step of generating, at the electronic device, an authentication message ($M_A$) and sending the authentication message ($M_A$) to the key device.

18. The method of claim 17, comprising a step of determining the deterministic authentication key ($DK_A$) by determining a hash of the message ($M_A$).

19. The method of claim 18, wherein the second key device private key ($V_{2C}$) is based on the deterministic authentication key ($DK_A$) and the first key device private key ($V_{1C}$), and the second key device public key ($P_{2C}$) is based on the deterministic authentication key ($DK_A$) and the first key device public key ($P_{1C}$).

20. The method of claim 19, comprising:
generating, at the key device, a signed authentication message ($SM_A$) based on the deterministic authentication key ($DK_A$) and the second key device private key ($V_{2C}$);
receiving, at the electronic device, the signed authentication message ($SM_A$) from the key device;
validating the signed message ($SM_A$) with the second key device public key ($P_{2C}$); and authenticating the key device based on the result of validating the signed authentication message ($SM_A$).

21. The method of claim 16, comprising a step of generating, at the key device, a second asymmetric cryptography pair having a second key device private key ($V_{2C}$) and a second key device public key ($P_{2C}$).

22. The method of claim 16, comprising:
requesting, at the electronic device, the information indicative of the deterministic key (DK) from the key device;
generating, at the key device, a signed message (SM) based on the message (M);
sending the signed message (SM) to the electronic device;
validating, at the electronic device, the signed message (SM); and
retrieving the message (M) such that the secret can be determined, at the electronic device, for decrypting the data.

23. A memory device storing thereon a computer program comprising machine-readable instructions to cause a processing device of an electronic device to implement the method of claim 16.

24. A memory device storing thereon a computer program comprising machine-readable instructions to cause a processing device of an electronic device to implement the method of claim 1.

25. A computer system for encrypting data at an electronic device, the computer system comprising:
the electronic device being associated with a first asymmetric cryptography pair having a first electronic device private key ($V_{1S}$) and a first electronic device public key ($P_{1S}$); and
a key device being associated with a second asymmetric cryptography pair having a first key device private key ($V_{1C}$) and a first key device public key ($P_{1C}$),
wherein the electronic device comprises a processor configured to:
determine a deterministic key (DK);
receive the first key device public key ($P_{1C}$) from the key device;
determine a second electronic device private key ($V_{2S}$) based on at least the first electronic device private key ($V_{1S}$) and the deterministic key (DK);
determine a second key device public key ($P_{2C}$) based on at least the first key device public key ($P_{1C}$) and the deterministic key (DK);
determine a secret based on at least the second electronic device private key ($V_{2S}$) and the second key device public key ($P_{2C}$); and
encrypt the data on the electronic device using the determined secret or an encryption key that is based on the determined secret; and
wherein information indicative of the deterministic key (DK) is stored on the key device.

26. The computer system of claim 25, further configured to decrypt data, the processor of the electronic device being configured to:
receive the information indicative of the deterministic key (DK), from the key device;
determine the secret based on the information indicative of the deterministic key (DK); and
decrypt the data using the determined secret or the encryption key that is based on the determined secret.

27. An electronic device for encrypting data, the electronic device being associated with a key device, wherein the electronic device is associated with a first asymmetric cryptography pair having a first electronic device private key ($V_{1S}$) and a first electronic device public key ($P_{1S}$), and the key device is associated with a second asymmetric cryptography pair having a first key device private key ($V_{1C}$) and a first key device public key ($P_{1C}$); the electronic device comprising a processing device configured to:
determine a deterministic key (DK);
receive the first key device public key ($P_{1C}$) from the associated key device;
determine a second electronic device private key ($V_{2S}$) based on at least the first electronic device private key ($V_{1S}$) and the deterministic key (DK);
determine a second key device public key ($P_{2C}$) based on at least the first key device public key ($P_{1C}$) and the deterministic key (DK);
determine a secret based on at least the second electronic device private key ($V_{2S}$) and the second key device public key ($P_{2C}$); and
encrypt the data on the electronic device using the determined secret or an encryption key that is based on the determined secret;
wherein information indicative of the deterministic key (DK) is sent to the key device where it can be stored.

* * * * *